March 25, 1947.  J. W. TETER  2,417,892
PRODUCTION OF AMINES AND NITRILES
Filed Oct. 12, 1944
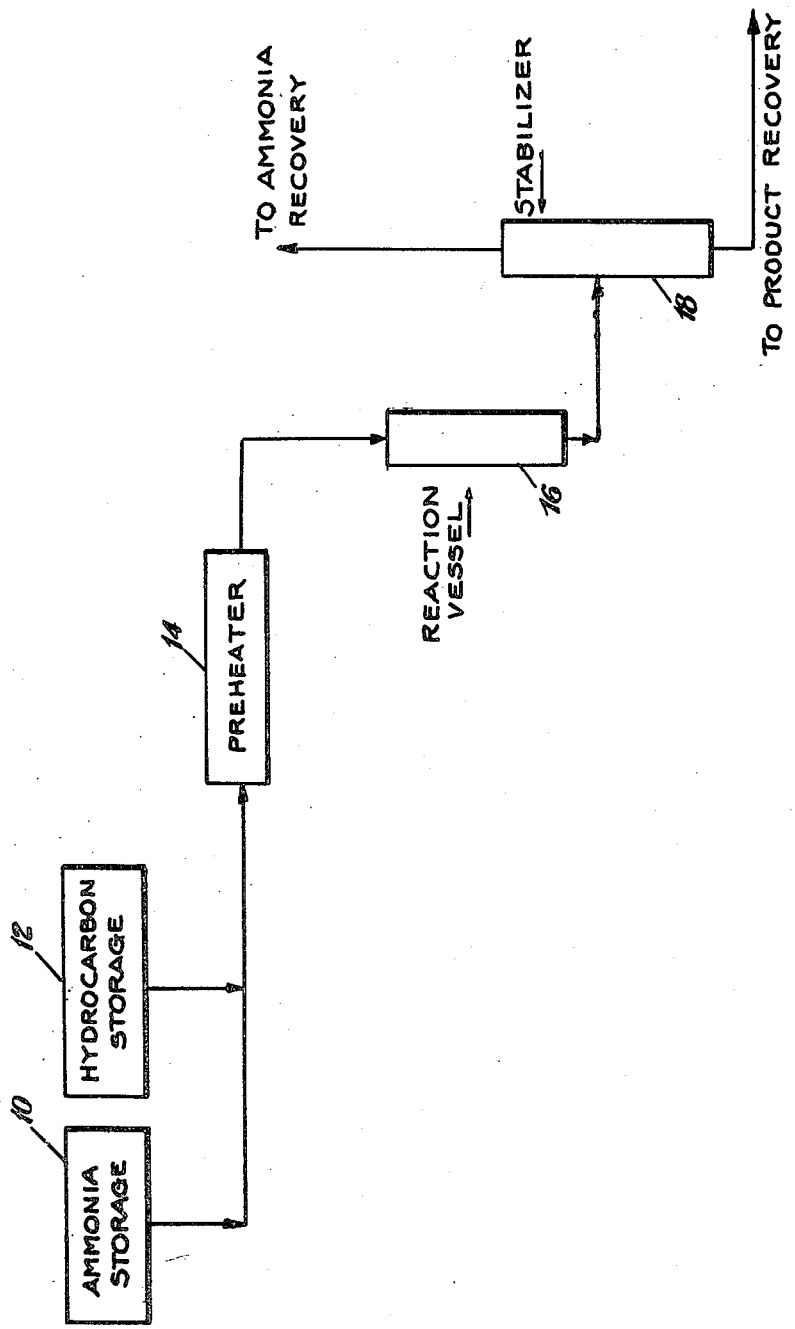

Patented Mar. 25, 1947

2,417,892

UNITED STATES PATENT OFFICE 2,417,892

PRODUCTION OF AMINES AND NITRILES

John W. Teter, Chicago, Ill., assignor to Sinclair Refining Company, New York, N. Y., a corporation of Maine Application October 12, 1944, Serial No. 558,480

4 Claims. (Cl. 260—464)

This invention relates to improvements in the production of nitrogen-containing products by the direct, catalytic reaction of ammonia and olefins. It is of particular application to the production of nitrogen-containing products, largely nitriles, from ethylene and propylene, particularly the latter.

The reaction of ammonia with olefins, and particularly with propylene and ethylene, is a complex reaction which results in a number of different nitrogen-containing products, predominantly nitriles. Thus, in the direct amination of propylene in the presence of an amination catalyst, 10 to 20% of the olefin may be converted, per pass, to nitrogen-containing products. Of these, 70 to 80% or more will be the saturated nitriles having 2 to 4 carbon atoms, with propionitrile perhaps predominating but with substantial proportions of butyronitrile and acetonitrile. Accompanying these nitriles is a substantial amount of isopropylamine, higher nitriles, and more complex products, including pyridine and alkylated pyridines.

The reaction is carried out at high temperatures, for example, 450 to 800° F., and advantageously under high pressures, for example, 1000 to 3000 pounds per square inch. The reaction is accompanied by side reactions which include cracking, polymerization, formation of tar, formation of coke, or carbon, and other reactions. The activity of the catalyst is not maintained at a high level for long periods of time, but, on the contrary, the catalyst must be reactivated frequently, for example, every 6 to 10 hours. Reactivation is carried out by purging the system, as with the use of ammonia or nitrogen, and then introducing hydrogen at high temperatures and pressures. This seems to remove tars and the like which accumulate on the catalyst by hydrogenation, and effectively reactivates the catalyst so that the total active life of the catalyst may be many months. In general, by providing two reactors in parallel, one may be on stream while the other is being reactivated, and the process thus made substantially continuous.

Effective catalysts are reduced metal oxides. Reduced cobalt oxide is particularly effective. The catalyst is advantageously used in the form of pellets, the metal being supported on a suitable carrier and the supported product made into pellets. Suitable supports include cobalt, silicate, diatomaceous earth, and the like. See, for example, applications Serial Nos. 444,095, 444,096, and 444,097, filed May 22, 1942.

These catalysts in general are prepared by making a slurry of the support in a solution of a cobalt or other metal salt, such as cobalt acetate or cobalt sulfate and precipitating the cobalt by the addition of alkali, either sodium carbonate or sodium hydroxide or the like, carefully washing the resulting product to reduce the soluble salt content to a very low figure, calcining, and then reducing with hydrogen at relatively high temperatures, for example, those temperatures to be subsequently used in the amination procedure.

During the amination operation, if the catalyst becomes overheated, it tends to sinter, to lose its activity, and to become substantially worthless. It may even block the reactor, and prevent the flow of gases through it.

The present invention provides improvements which provide for adequate control of the temperature, which improve the yield of nitrogen-containing products, based on the olefin feed, and prolong the active life of the catalyst.

In accordance with the present invention, the amination reaction is carried out with the use of a large excess of ammonia, and, advantageously, with the use of saturated aliphatic hydrocarbons in admixture with the olefin. Thus, in accordance with the present invention, mixtures of saturated hydrocarbons and olefins, for example, propane and propylene, containing substantial quantities of the saturated hydrocarbon, which may range as high as 60% or more, and advantageously is in the range of about 40 to about 60%, are advantageously used in the reaction. Such mixtures are conveniently obtained as the P P fraction from the cracking operations, which may be deethanized if it contains an excessive quantity of $C_2$ gases. Such mixtures normally have but a very small quantity of $C_4$ and $C_4$ plus hydrocarbons, and negligible quantities of fixed gases. Commonly, they are obtained in the form of gaseous mixtures containing 40 to 45% propylene, 50 to 55% propane, and the balance substantially all ethane, with negligible quantities of other lighter and heavier hydrocarbons. Such mixtures are peculiarly adapted for the practice of the present invention. They will be used, in the reaction, in admixture with ammonia in substantial excess based upon the olefin feed. Thus, there may be used about 10 mols of ammonia for each mol of olefin, although somewhat more ammonia than this may be used, and the amount used may be as little as 4 to 5 mols per mol of olefin. The two gases are admixed, heated to the necessary high temperatures, advantageously about 600–750° F. in the case of propylene, in a suitable preheater, and then brought into contact with the catalyst, advantageously in the form of an elongated bed in a vertical reaction vessel, the gases being introduced at the top and the reaction mixture being taken from the bottom. Substantial space velocities, for example, about 0.2 volume of liquid olefin feed per hour per volume of catalyst are advantageously used. As explained in application Serial No. 558,486, filed October 12, 1944, small quantities of water for example, 2 mol per cent based on the olefin, may be used with advantage, as such use of water seems to promote the efficiency of the catalyst and also to help prolong its life.

The amination reaction is exothermic, and as stated above, is accompanied by side reactions which result in the production of undesired products. Through the use of saturated hydrocarbons and excess ammonia, these side reactions are minimized and higher temperatures and pressures, with consequent greater conversion of olefin per pass and greater throughput may be used without the increase in side reactions, polymerization, cracking and the like, which would normally be expected with the carrying out of the reaction under more drastic conditions. In other words, through operating in accordance with the present invention, the effectiveness of the amination reaction with the production of desired nitrogen-containing products is promoted, without proportional promotion of the undesired reactions which not only result in the production of undesired products, with loss of olefin, but also tend to increase the rate of deterioration of the catalyst and lessen the period of activity before reactivation is required and also lessen its total useful life.

The invention will be illustrated in connection with the appended drawing, which shows diagrammatically apparatus in which the invention may be practiced.

In the drawing there are shown storage vessels 10 and 12 for ammonia and hydrocarbon. From these vessels, the reactants are supplied through a preheater 14 to the reaction vessel 16 under high pressure, e. g., 1000 to 3000 #/sq. in., and at a high temperature, e. g., 640° F. The reaction vessel is an elongated vertical vessel filled with catalyst in the form of pellets, the catalyst itself being cobalt supported on a suitable carrier. The gases from the reaction vessel are led to a stabilizer 18, in which ammonia and the like is taken overhead, the ammonia being recovered for reuse in the process, while from the stabilized product are recovered the desired nitrogen-containing products which are produced, by suitable fractionation or other means.

The invention will be illustrated by the following example, but it is not limited thereto.

*Example.*—A hydrocarbon feed stock, with the following composition:

| | Per cent |
|---|---|
| $C_2$ | 5.2 |
| $C_3$ | 44.1 |
| $C_3^=$ | 48.7 |
| $C_4$ | 2.1 | was supplied with ammonia, with a molar ration of ammonia to olefin of 10.7, to the reaction vessel at an olefin space velocity (vol. liq. olefin per vol. catalyst per hour) of 0.104, under a pressure of 1500 #/sq. in., and at a reaction temperature of 700° F. 28.07% of nitrogen-containing products, including 0.06% of isopropylamine, 4.78% of acetonitrile, 12.97% of propionitrile, 5.65% of butyronitrile, 4.61% of heavier nitriles and 5.59% of polymeric material, based on the olefin charged, were obtained from the reaction mixture.

While the invention has been described with particular reference to the reaction between ammonia and propylene, it is equally applicable to the reaction between ammonia and other olefins, in particular ethylene, and ammonia and mixtures of olefins, such as ethylene and propylene. Heavier olefins, such as butylene, may, of course, be reacted with ammonia in accordance with the invention, to give improved yields as compared with those obtained without the use of a large excess of ammonia or the use of a saturated hydrocarbon.

We claim:

1. In the production of amines and nitriles by the reaction of olefins with ammonia at an elevated temperature approximating 450–800° F. and an elevated pressure approximating 1000–3000 pounds per square inch in the presence of a catalyst comprising reduced cobalt oxide which selectively favors amination of the olefin, the improvement which comprises supplying to the catalytic reaction zone a mixture containing olefin and ammonia with the ammonia-olefin ratio at least 5:1.

2. In the production of amines and nitriles by the reaction of olefins with ammonia at an elevated temperature approximating 450–800° F. and an elevated pressure approximating 1000–3000 pounds per square inch in the presence of a catalyst comprising reduced cobalt oxide which selectively favors amination of the olefin, the improvement which comprises supplying to the catalytic reaction zone a mixture containing olefin and ammonia with the ammonia-olefin ratio about 10:1.

3. In the production of amines and nitriles by the reaction of olefins with ammonia at an elevated temperature approximating 450–800° F. and an elevated pressure approximating 1000–3000 pounds per square inch in the presence of a catalyst comprising reduced cobalt oxide which selectively favors amination of the olefin, the improvement which comprises carrying out the reaction between the olefin and the ammonia in the presence of a saturated hydrocarbon and with the ammonia-olefin ratio at least 5:1.

4. In the production of amines and nitriles by the reaction of olefins with ammonia at an elevated temperature approximating 450–800° F. and an elevated pressure approximating 1000–3000 pounds per square inch in the presence of a catalyst comprising reduced cobalt oxide which selectively favors amination of the olefin, the improvement which comprises carrying out the reaction between the olefin and the ammonia in the presence of a saturated hydrocarbon with the olefin-saturated hydrocarbon ratio ranging from about .67 to about 1.33, and with the ammonia-olefin ratio at least 5:1.

JOHN W. TETER.

REFERENCES CITED

The following references are of record in the file of this patent:

UNITED STATES PATENTS

| Number | Name | Date |
|---|---|---|
| 1,492,194 | Beindl | Apr. 29, 1924 |
| 1,920,795 | Jaeger | Aug. 1, 1933 |
| 1,934,610 | Wheeler | Nov. 7, 1933 |
| 1,872,923 | Fulton | Aug. 23, 1932 |